United States Patent
Pinto et al.

[11] Patent Number: 5,899,469
[45] Date of Patent: May 4, 1999

[54] VEHICLE WITH LOCKABLE CASTERS

[76] Inventors: David Alexander Pinto, 3312 Michael Ave.; Matthew Alexander Pinto, 3425 Northview Dr., both of Kalamazoo, Mich. 49004

[21] Appl. No.: 08/796,225

[22] Filed: Feb. 6, 1997

[51] Int. Cl.⁶ ........................................................ B62B 5/04
[52] U.S. Cl. .................................... 280/79.11; 280/304.1; 280/47.35; 16/35 R
[58] Field of Search ........................ 16/35 R; 280/47.34, 280/47.35, 79.11, 79.3, 33.994, 47.371, 304.1; 5/86.1

[56] References Cited

U.S. PATENT DOCUMENTS

| | | | |
|---|---|---|---|
| 2,192,282 | 3/1940 | Warner | 244/109 |
| 2,251,567 | 8/1941 | Gould et al. | 16/35 |
| 2,422,892 | 6/1947 | Forbes et al. | 16/35 |
| 2,525,362 | 10/1950 | Levy | 267/1 |
| 2,566,853 | 9/1951 | Reinhardt | 16/35 |
| 2,687,546 | 8/1954 | Oppenheimer | 16/26 |
| 3,026,558 | 3/1962 | Mulholland | 16/44 |
| 3,085,285 | 4/1963 | Morlick | 16/35 |
| 4,336,629 | 6/1982 | Jarvis, Jr. et al. | 16/35 |
| 4,349,938 | 9/1982 | Fontana | 16/35 |
| 4,515,385 | 5/1985 | Christian | 280/304.1 |
| 4,875,696 | 10/1989 | Welch et al. | 280/47.34 |
| 4,895,474 | 1/1990 | Echle | 403/292 |
| 5,170,529 | 12/1992 | Kovacs | 16/35 R |
| 5,315,290 | 5/1994 | Moreno et al. | 280/33.994 |
| 5,342,072 | 8/1994 | Prasad | 280/87.051 |
| 5,377,372 | 1/1995 | Rudolf et al. | 16/35 R |
| 5,503,416 | 4/1996 | Aoki et al. | 16/35 R |
| 5,626,362 | 5/1997 | Mottola | 280/767 |

*Primary Examiner*—Lanna Mai
*Assistant Examiner*—Avraham H. Lerner
*Attorney, Agent, or Firm*—Joseph K. Andonian

[57] ABSTRACT

A substantially rectangular vehicle moveable on four casters located in the four corners underneath the vehicle. The front or rear pair of casters can be locked or unlocked electronically by a single individual propelling the vehicle from one end to facilitate movement over irregular surfaces or narrow passages.

6 Claims, 6 Drawing Sheets

VEHICLE WITH LOCKABLE CASTERS

This invention relates to a substantially rectangular vehicle having four casters located in the four corners beneath the vehicle. When propelled from one end or side of the vehicle, the two casters located in the opposite end or side of the vehicle are free to rotate or swivel about a vertical axis. The two remaining casters are normally locked to prevent such movement and thereby provide the operator with greater steering control. However the vehicle is equipped with means to permit an operator to unlock the locked casters or lock the unlocked casters at will to facilitate movement in any desired direction: straight forward or backward or any direction from side to side.

TECHNICAL FIELD

This invention relates to an improvement in caster equipped rectangular vehicles such as manually operated gurneys, hand carts or wheel chairs used to move patients or cargo especially in hospitals or business establishments. The four casters normally located underneath such vehicles at or near the four corners of the rectangle are free to revolve or swivel about a vertical axis. The present improvement would maintain two of the casters in a locked position to provide better steering control but would be equipped with means for simultaneously unlocking the two locked casters or locking the two unlocked casters at the will of the operator to provide greater flexibility of movement when desired.

BACKGROUND OF THE INVENTION

Many vehicles in common use are equipped with freely rotating casters to provide ease and flexibility of movement. Wheel chairs and shopping carts are examples with such casters in front and fixed wheels in back which can only roll forward or backward. Hospital gurneys and hand carts generally employ freely rotating casters in all four corners of the vehicle. The fixed wheels, that is wheels which roll about a horizontal but don't rotate about a vertical axis, employed in shopping carts and wheel chairs enable the user to maintain better control when moving forward and backward or turning, the most important movements for those types of vehicles. Hospital gurneys and hand carts on the other hand must also be capable of moving sideways. Such additional flexibility of movement does however make it more difficult to steer the vehicle through narrow openings (such as doorways) or uneven surfaces (such as gaps in the floor leading into an elevator or raised obstacles like door jambs in doorways), especially when the vehicle is being propelled by a single person. The problem is most acute when the vehicle, such as a gurney, is longer than it is wide. Any off-center force applied by a single person pushing such a vehicle with four freely rotating casters from the rear will make it difficult to control the movement of the vehicle, especially of the front end.

Some hospital gurneys employ means for inhibiting rotation about a vertical axis by adding frictional resistance on all four casters to achieve better control but this has the disadvantages of greater complexity in construction and increased force to turn the gurney. Other gurneys employ a fifth locked wheel in the center underneath the gurney which can be lowered from a normally raised position to contact the floor and thereby resist turning. That arrangement is only useful when straight forward and backward movement is desired but only to the limited extent that one centered wheel can control movement. Other vehicles provide means for locking and unlocking all four casters individually or collectively, sometimes locking the casters in more than one position. Such increased capability is even more complex to construct and operate.

The present invention minimizes the foregoing difficulties by locking the casters on the front or rear end of the vehicle but also providing means for unlocking normally locked casters to permit movement in any direction when desired or locking unlocked casters to facilitate straight forward or backward movement. For example, free swiveling is desirable when attempting to parallel park a gurney between the furniture or equipment positioned against the wall of a hospital room. Free swiveling on all four caster is not desirable when attempting to steer the gurney from one end through narrow openings. Similar situations are encountered by other manually operated vehicles with freely rotating casters such as carts used to transport light cargo through narrow openings over uneven surfaces in cluttered factories, warehouses or offices. The present invention attempts to address this problem in a simpler and more cost effective manner than increasing frictional resistance to rotation on all four casters, adding a fifth wheel or providing means for locking or unlocking all four wheels.

OBJECTS OF THE INVENTION

It is therefore an object of this invention to provide an improvement in vehicles equipped with casters which can be steered manually with greater precision without sacrificing the flexibility of movement normally provided by freely swiveling casters.

Another object of this invention is to provide such a vehicle having a substantially rectangular configuration with casters in each corner of the rectangle beneath the vehicle wherein the vehicle can not only be easily steered manually on a straight course in a chosen direction but also be free to move in any direction when desired by a single operator.

A further object of this invention is to provide a hospital gurney equipped with four casters (1) which has excellent steering control when pushed by a single operator through narrow openings or uneven surfaces due to the presence of two locked casters in either the front end or the rear end of the gurney and (2) which can also be freely moved in any desired direction due to the presence of control means for simultaneously unlocking the locked casters to permit all four casters to rotate freely about a vertical axis.

A still further object of this invention is to provide means for locking freely rotating casters to facilitate passage over uneven surfaces.

Other objects will be apparent from the description that follows.

SUMMARY OF INVENTION

The present invention provides a substantially rectangular vehicle having a front end and a rear end and having four casters each positioned underneath the vehicle near one of the four corners of the rectangle wherein the caster wheels are capable of rolling vertically on a horizontal axle connected to the open end of U-shaped frames which are in turn connected at their closed ends to journals rotatably housed underneath the vehicle and are capable of rotating horizontally about a vertical axis and wherein the two journals located in one end of the vehicle are normally locked so that the wheels will be capable of rolling only in a direction parallel to the sides of the vehicle. The combination of the wheel, axle, frame and journal are generally characterized as casters. The frame provides an inverted U-shaped support for a wheel rotating on an axle located inside the open end of the U. The closed end of the U is firmly fastened to a journal that is capable of rotating inside a bore in a housing affixed to the underside of the vehicle. The bore acts as a bearing for the journal. Means are affixed to the housing to lock the two journals located in one end of the vehicle so that the wheels connected to those journals are capable only of rolling in the direction the vehicle is itself being propelled. The locking means preferably comprises a solenoid controlled pin which fits a matching bore or hole in the journal. When the solenoid is not activated an expanded spring inside the solenoid housing forces the pin outward until the pin locates the bore in the rotating journal with which it is associated to lock the journal so the wheel associated with the journal will only roll in the chosen direction. When the two casters located in the rear or steering end of the vehicle are locked, the vehicle can be steered in a chosen direction by a single operator much more effectively than if all four casters are free to swivel freely. Use of a single operator is especially desirable in the present cost conscious climate which aims to reduce manpower wherever possible. For example hospital gurneys are often used to transport patients through cluttered hallways or narrow doorways from place to place or in and out of elevators. Wheel chairs normally employ fixed wheels in the rear and freely rotating casters in front. Difficulties are often encountered in propelling wheel chairs over uneven surfaces when the wheels fall into gaps in the floor leading in or out of elevators or are impeded by raised door jams. Means for locking the front wheels when approaching such obstacles or simply to facilitate movement straight forward or backward is highly desirable. The attendant propelling a gurney is generally pushing the gurney from the rear (actually the end where the head of the patient being moved is usually located) and has difficulty preventing the wheels at the other end (the foot of the gurney) from turning in a direction essentially perpendicular to the direction of desired movement when they fall into such openings or encounter such door jambs. Similar obstacles are also encountered by hand carts in factories, warehouses, retail establishments or wheelchair and shopping cart users. Thus means for locking or unlocking casters located in the front or rear end of such vehicles to prevent rotation about a vertical axis is highly desirable.

List of Reference Numerals

Figure 1:
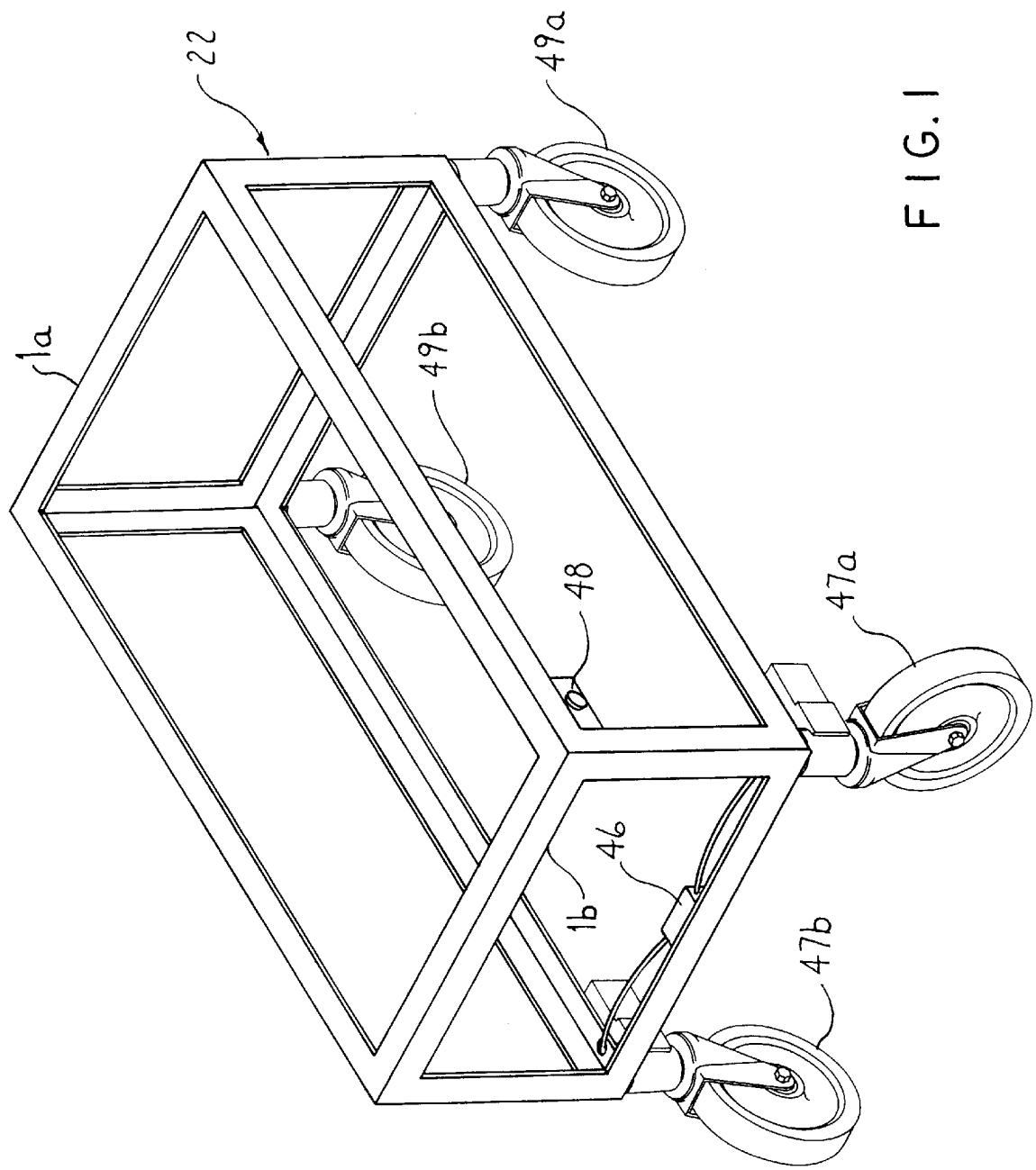
FIG. 1 is a perspective view of a representative vehicle with four casters.

1a Front end of vehicle
1b Rear end of vehicle
2 Wheel
4 Axle
6 Frame or knuckle
7a & 7b Openings in frame for axle
8 Stud to attach journal to housing
10 Journal
11 Bore in journal
12 Housing
13 Bolt for attachment of the caster assembly to the vehicle
14 Solenoid
16 Solenoid cover
18a & 18b Thrust washers or spacers
20 Thrust bearing
22 Vehicle
24 Solenoid plunger
26 Hole in housing to receive solenoid plunger
28 Hole in journal to receive solenoid plunger
29 Opening in housing to receive journal
30 Threaded opening in housing to receive solenoid
32 Threaded portion of solenoid
34 Threaded portion of housing to receive stud
36 Threaded portion of stud
38 Shaft to attach housing to vehicle
40 Knurled portion of stud
42 Location of weld to fasten frame to shaft
44 Shaft for attachment of caster-housing-solenoid combination to vehicle
45a First opening for bolting shaft to vehicle
45b Second opening for bolting shaft to vehicle
46 Battery case
47a, 47b, 47c and 47d Lockable casters
48 Switch
49a & 49b Freely swiveling casters
50 Disassembled caster-housing-solenoid combination
51 Assembled caster without wheel
52 Wheelchair
53a and 53b Locked casters of wheelchair.

PREFERRED EMBODIMENT OF THE INVENTION

A representative embodiment of the present invention is illustrated in FIG. 1. A preferred embodiment would be a hospital gurney which, for purposes of illustrating the essential features of the present invention, could have the same four casters and their associated locking means as the cart illustrated in FIG. 1. A representative structure of such a caster and solenoid locking means is displayed in FIG. 2 in disassembled form. A perspective view of the preferred structure of the caster without the wheel is displayed in FIG. 3 in assembled form. Many other electrically powered or mechanical mean could also be used to lock or unlock the casters.

Figure 4:
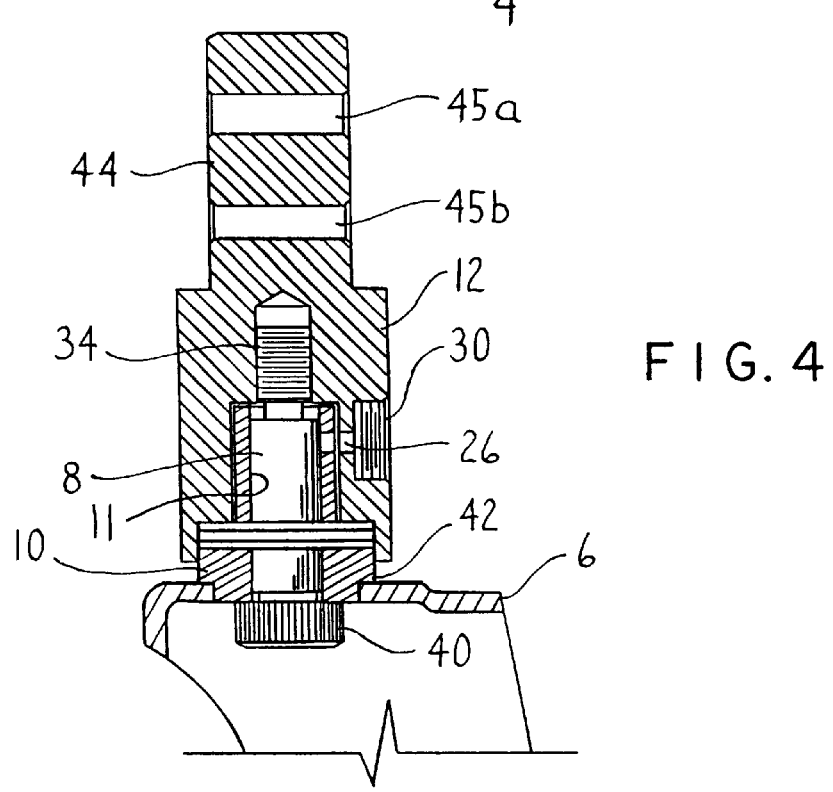
FIG. 4 is a cross-section of the caster along lines A—A in FIG. 3.
Figure 6:
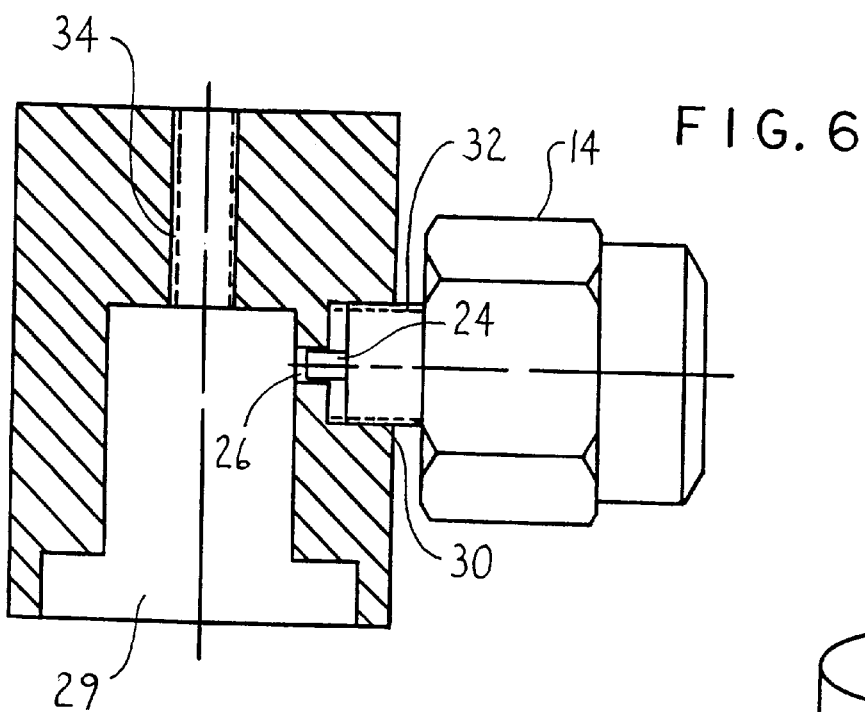
FIG. 6 is a cross-section of the housing and displays its relationship to the assembled solenoid.
Figure 5:
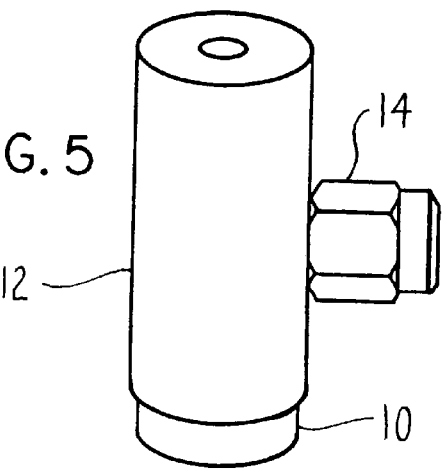
FIG. 5 is a perspective view of the solenoid-housing-journal-stud assembly.
Figure 7:
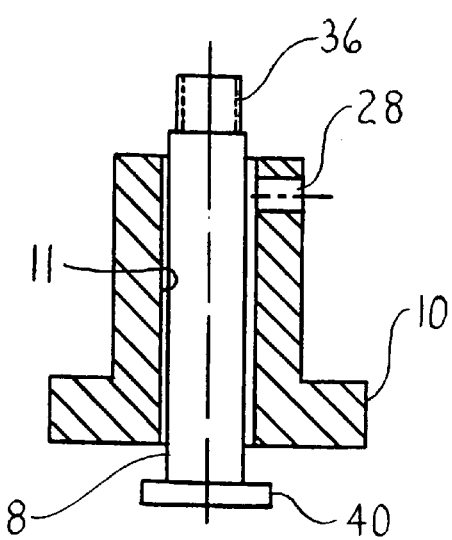
FIG. 7 is a cross-section of the journal and displays its relationship to the stud.

The preferred structure for a caster suitable for the present invention comprises a wheel 2, an axle 4, a inverted U-shaped frame 4 and a journal 10. The wheel 2 freely revolves around the axle 4 affixed to the openings 7a and 7b in the open end of the frame 4. The closed end of the frame is preferably welded to the journal 10. The caster assembly is affixed to the housing 12 by the stud 8 through a cylindrical bore 11 in the journal 10. The combination of spacers 18a and 18b sandwiched around thrust bearing 20 are located between the surface of journal 10 where it contacts the matching surface of housing 12 thereby permitting the caster assembly to rotate freely inside the housing 12 which has been machined to accept, and act as a bearing for, the journal 10, best illustrated in cross-section in FIG. 4. The housing 12 is affixed to the vehicle 22 by bolt 13 or alternatively and preferably by bolts (not shown) through openings 45a and 45b in shaft 44.

The vehicles suitable for the present invention, illustrated in rudimentary form in FIG. 1, are preferably substantially rectangular in structure having a front end 1a and a rear end 1b and having two casters widely spaced underneath each end. When maneuvering the vehicles through narrow openings or over uneven surfaces of the floors of hospital and warehouse buildings, the casters preferably located in the rear or steering end 1b of the vehicle 22 are prevented from rotating or swiveling horizontally while the caster wheels retain the ability to roll freely vertically to facilitate horizontal movement of the vehicle in the desired direction. For example, when the vehicle 22 is being propelled manually from the rear end 1b by a single individual trying to turn the vehicle 22 to pass through a narrow opening such as a doorway, it is highly desirable to limit side-to-side movement while retaining the ability to turn the front end 1a of the vehicle 22 and gain purchase to pass through the door opening. When all four casters 47a 47b 49a 49b rotate freely, it is difficult for a single individual pushing the vehicle 22 from the rear end 1b to avoid applying off-center force to steer the vehicle 22. The undesirable sideways movement of the vehicle 22 can be avoided by preventing the rear wheels 47a and 47b from swiveling horizontally. The preferred means for preventing swiveling is to lock the caster assembly by preventing the journal 10 from rotating inside the housing 12.

Figure 2:
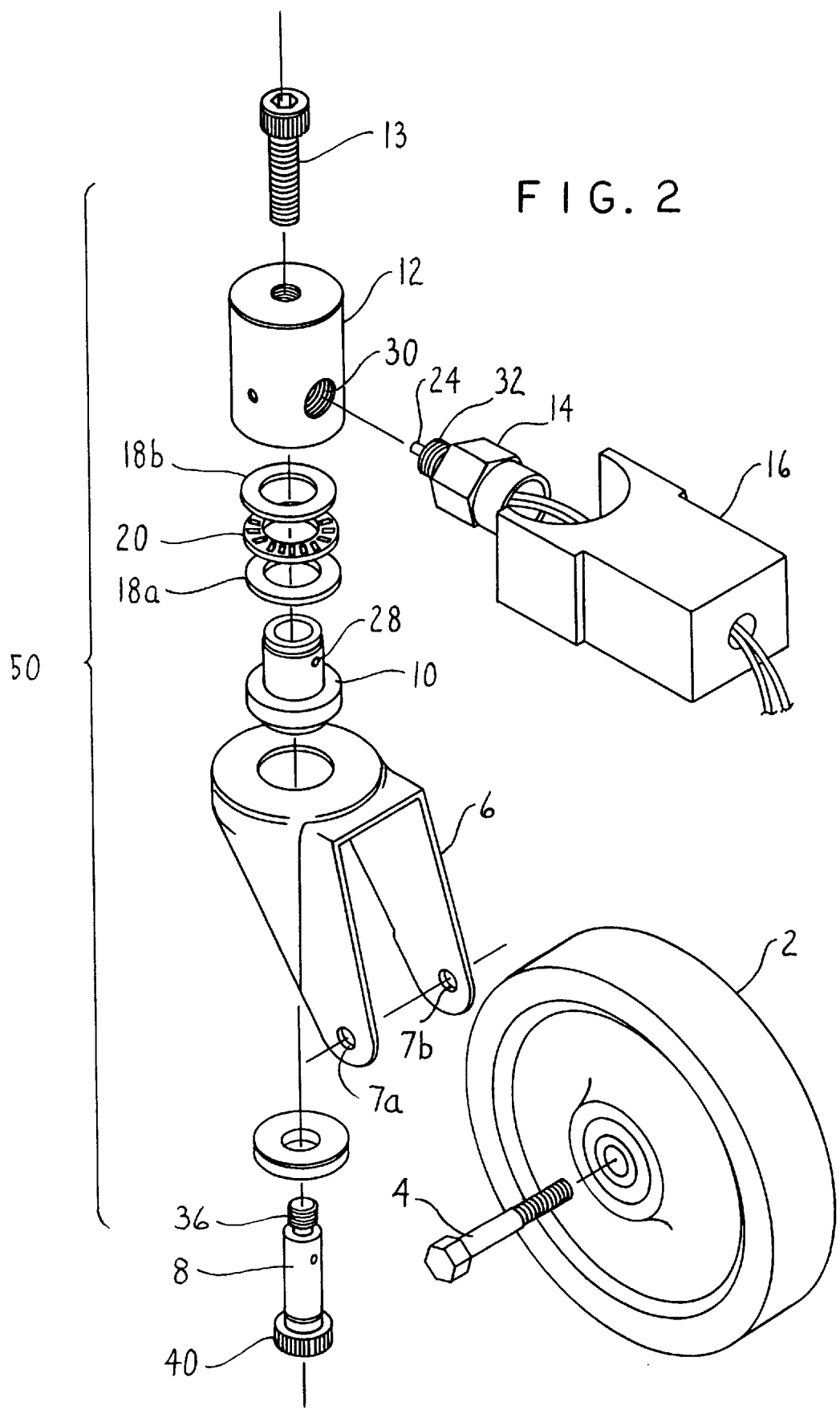
FIG. 2 displays a disassembled caster, housing and solenoid combination.
Figure 3:
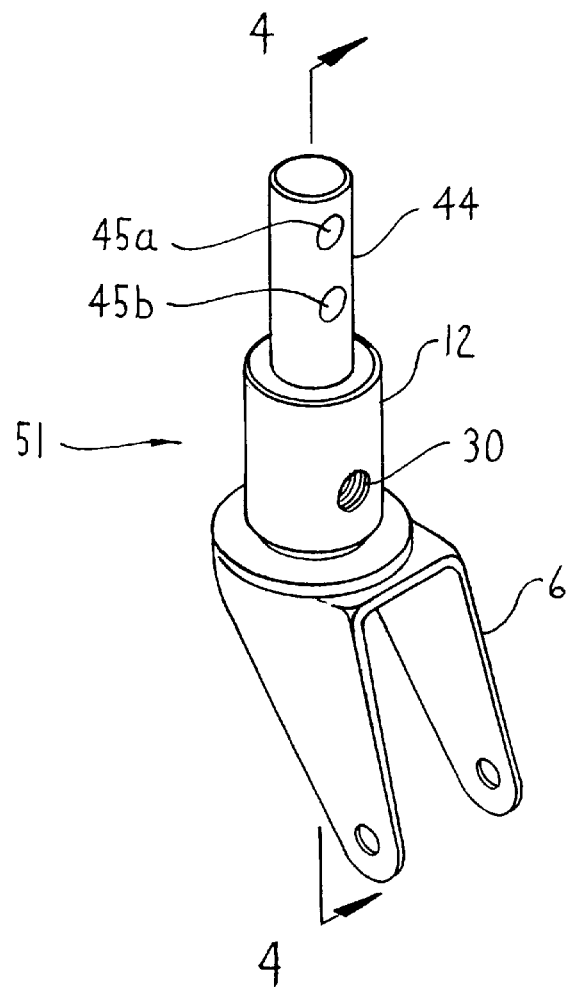
FIG. 3 is a perspective view of the caster without the wheel in combination with the housing.

A representative caster-housing-solenoid combination is shown in FIG. 2. The preferred locking means comprises a solenoid 14 actuated pin 24 which is normally extended to fit inside a locating hole 28 in the journal 10 to prevent the rotation of the journal 10. The journal 10 is preferable welded to the frame 6 and is prevented from rotating along with the journal 10. The solenoid 14 is affixed to the housing 12 by screwing the threaded portion 32 of the solenoid 14 into the corresponding threaded opening 30 of the housing 12. The pin or plunger 24 is retracted into and extended out of the solenoid 14 body by the standard solenoid mechanism. The solenoid 14 consists of a pin 24, a spring (not shown) and a coil of wire (not shown) arranged inside a cover 16 to move the pin 24 out of and release it back into the body of the solenoid 14. When an electrical current passes through the coil, it compresses the spring and retracts the pin 24 into the body of the solenoid 14. When no electrical current is passing through the coil, the spring expands and forces the pin 24 out of the body of the solenoid 14 against the side of the journal 10 until the pin 24 locates the hole 28 in the journal 10. Any electrical or mechanical means suitable for extending and retracting the pin out of and back into the matching hole in the journal would be acceptable for use in the present invention.

The electrical power to activate the solenoid 14 is preferably supplied by a 12-volt battery housed in battery case 46 which can be located on the vehicle 2 in any convenient location such as in a lower support member of the vehicle 2 such as pictured in FIG. 1. The hand operated switch 48 should be located on the vehicle 2 where it is readily accessible to the user when he is pushing the vehicle, usually from the rear or on the opposite side from the lockable casters 47a and 47b.

Alternative but not preferably to the foregoing arrangement of lockable and freely swiveling casters, the lockable casters can be located in the front end 1b either instead of or in addition to the rear end 1b of the vehicle 22. If instead of the rear end 1b, the vehicle is somewhat harder to maneuver but still better than having freely swiveling casters on all four corners of the vehicle 22. If in addition to the rear end 1b, the additional cost of the arrangement would be hard to justify unless the vehicle 22 is often and interchangeably propelled from either end.

Figure 8:
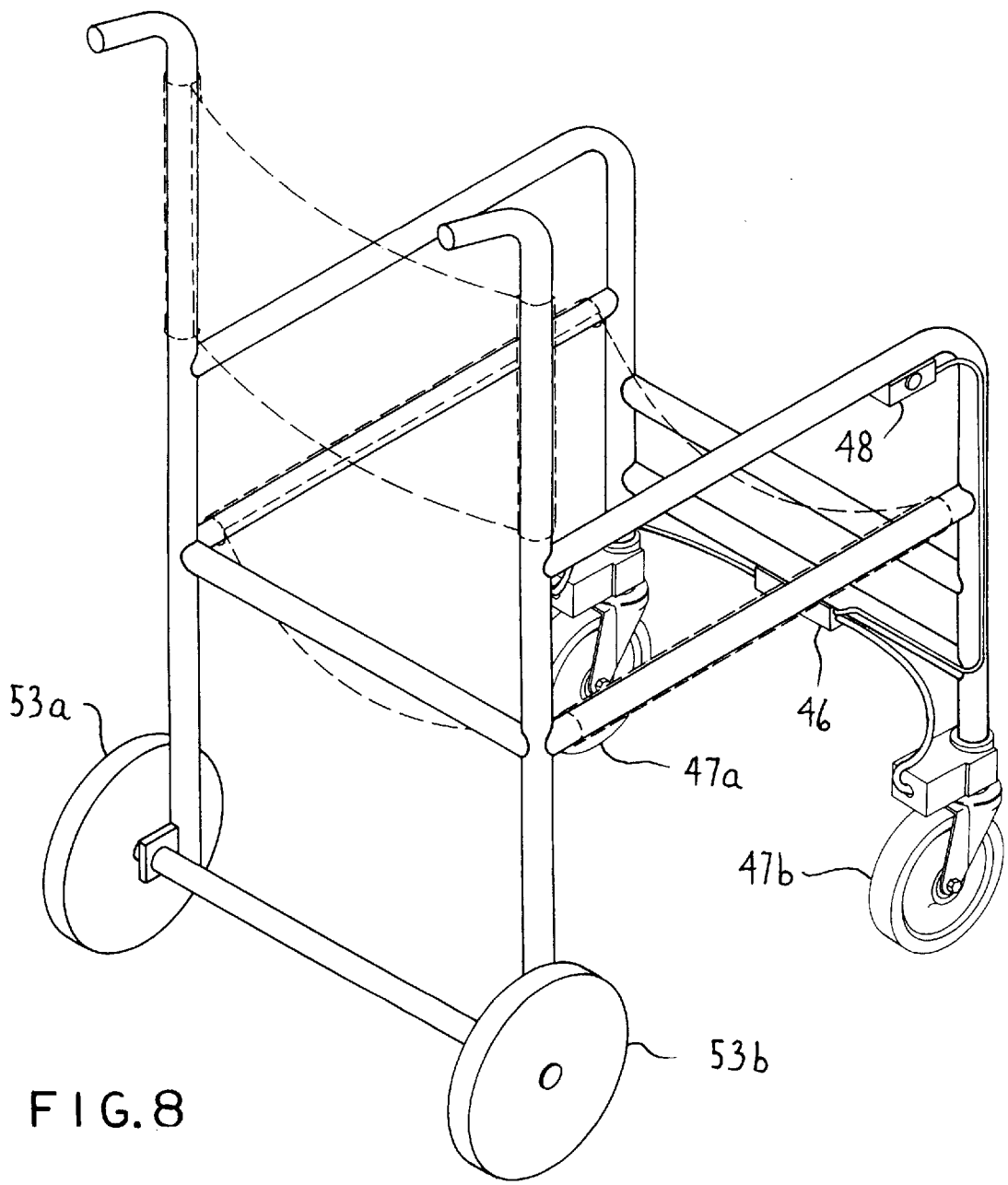
FIG. 8 is a perspective view of a rudimentary wheel chair configuration with lockable front casters.
Figure 9:
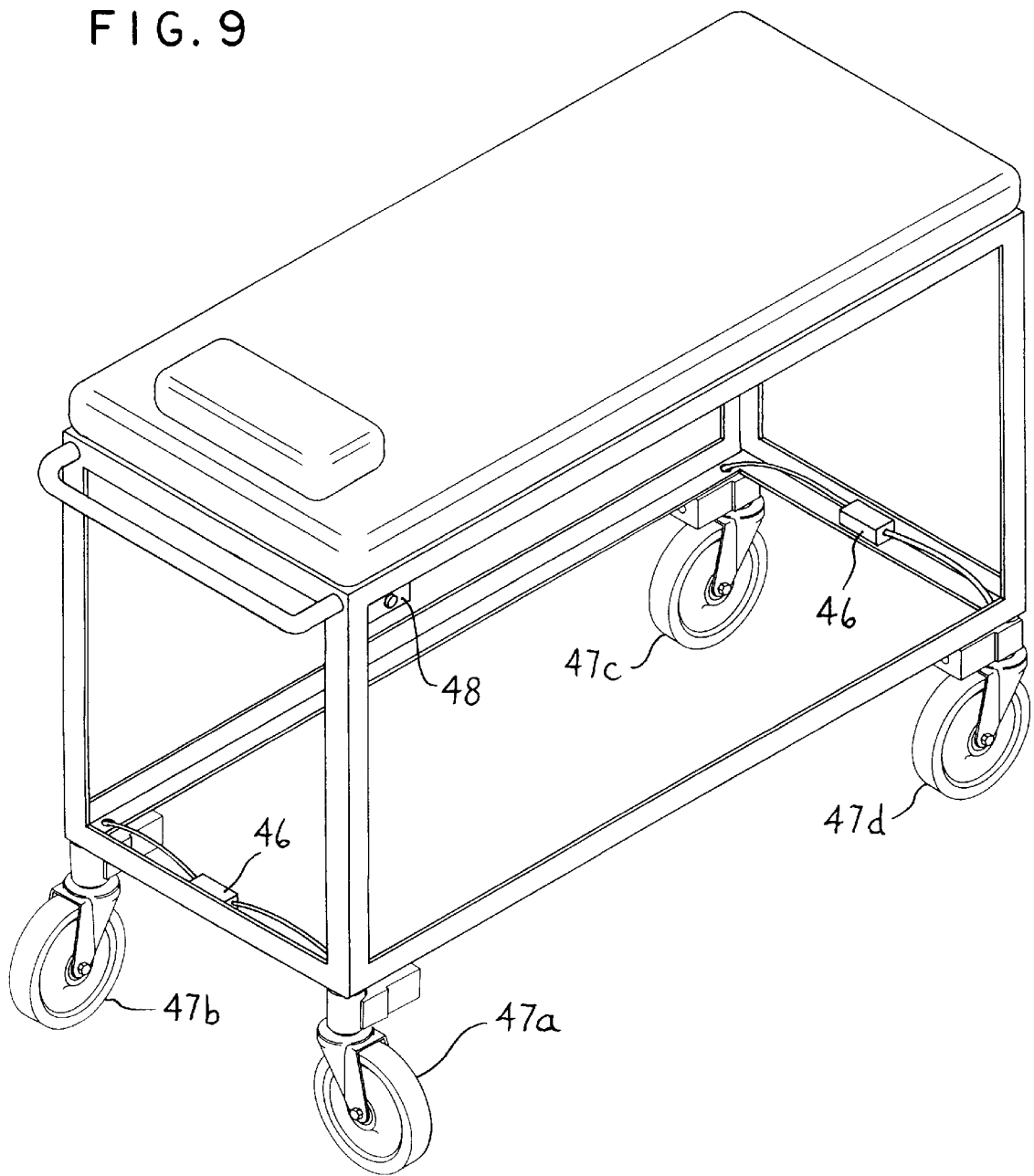
FIG. 9 is a perspective view of a rudimentary gurney configuration with lockable front and rear casters.

When the vehicle is configured closer to a square, such as a wheelchair (FIG. 8) or a shopping cart (not shown), locked casters 53a and 53b are usually located in the rear portion of the vehicle. However, it would still be useful to be able to lock the front casters 47a and 47b in circumstances where it is desirable to prevent the front casters 47a and 47b from being obstructed by irregular surfaces such as openings in the floor or door jambs. The wheels of freely swiveling casters are often turned in a direction perpendicular to the desired direction of movement when confronted by such obstacles. When the front facing casters are prevented from turning and locked in the same orientation as the rear wheels, such obstructions are easier to overcome. Solenoids suitable for locking such casters are different from the solenoids described above in that the locking pin is normally retracted into the body of the solenoid and extended out of the body when the solenoid is electrically actuated.

The embodiments of the invention disclosed herein represent preferred embodiments of the invention. Many other variations are possible but are too numerous to disclose in their entirety. The words and drawings used herein are merely descriptive and illustrative and are not intended as exact representations of or inflexible limitations on the spirit and scope of the invention disclosed herein which can only be measured by the legally valid scope of the appended claims.

What is claimed is:

1. A vehicle for transporting cargo comprising
   a substantially rectangular base having a front end, a rear end and two sides,
   two widely spaced casters located underneath the vehicle at both the front and rear ends of the vehicle said casters being freely rotatable horizontally about a vertical axis,
   means for locking the casters at the front or rear end of the vehicle to prevent such rotation of the casters while permitting caster wheels to roll in a direction parallel to the sides of the vehicle and
   means for substantially simultaneously unlocking the casters at the front or rear end of the vehicle to permit unrestricted movement of the vehicle in any side-to-side or front-to-rear direction wherein said means are powered electronically and can be actuated manually from one end of the vehicle by a single individual while propelling the vehicle without stopping or changing position.

2. The vehicle of claim 1 wherein the means for locking and unlocking the casters at one end of the vehicle comprises a solenoid controlled pin that engages an opening in a journal connected to a frame that supports a caster wheel and prevents rotation of the caster about a vertical axis.

3. The vehicle of claim 1 wherein the vehicle is a manually propelled gurney used to transport patients.

4. The vehicle of claim 1 wherein the vehicle is longer than it is wide and locked casters which can be unlocked substantially simultaneously at will are located in the rear or steering end of the vehicle.

5. The vehicle of claim 1 wherein the vehicle has a substantially square configuration and unlocked casters which can be locked substantially simultaneously at will are located in the front end of the vehicle and locked casters are located at the rear end of the vehicle.

6. The vehicle of claim 5 wherein the vehicle is a wheel chair.

* * * * *